L. H. SONDHEIM.
WATER STORAGE SYSTEM FOR USE IN EXTINGUISHING FIRES.
APPLICATION FILED MAY 15, 1906.

906,320 Patented Dec. 8, 1908.

3 SHEETS—SHEET 1.

WITNESSES

INVENTOR
Lewis H. Sondheim
BY
ATTORNEYS

L. H. SONDHEIM.
WATER STORAGE SYSTEM FOR USE IN EXTINGUISHING FIRES.
APPLICATION FILED MAY 15, 1906.

906,320.

Patented Dec. 8, 1908.

INVENTOR
Lewis H. Sondheim
BY Munn & Co
ATTORNEYS

UNITED STATES PATENT OFFICE.

LEWIS H. SONDHEIM, OF NEW YORK, N. Y.

WATER-STORAGE SYSTEM FOR USE IN EXTINGUISHING FIRES.

No. 906,320.  Specification of Letters Patent.  Patented Dec. 8, 1908.

Application filed May 15, 1906. Serial No. 316,985.

*To all whom it may concern:*

Be it known that I, LEWIS H. SONDHEIM, a citizen of the United States, and a resident of the city of New York, borough of Manhattan, in the county and State of New York, have invented a new and Improved Water-Storage System for Use in Extinguishing Fires, of which the following is a full, clear, and exact description.

The object of my invention is to provide a system whereby water may be stored in such a manner as to be available in the event the usual water supply should fail, as for instance, by the breakage of the water mains by earthquake shock, or such a temporary reduction of the normal pressure occurs in the mains at a given point as to cause an inadequacy in the supply.

In carrying out the invention I provide a series of reservoirs auxiliary to the mains or other source of supply, said reservoirs being preferably formed of individual tanks, each tank forming a unit of a predetermined unit capacity, and the number of units or the total capacity of the series being sufficient to be adequate for the buildings to be protected by the said series.

In the preferred form of the invention suitable connections are made with the main and between the several tanks, and the latter are provided with means for venting the same, the several pipes forming the connections and vents leading preferably to manholes accessible from the street, or other suitable point outside a building so as to be readily reached by firemen, when desired.

The arrangement is preferably such that the entire contents of one or more of the individual reservoirs can be withdrawn from any one of a series of outlets, so that should one outlet not be available, it will answer to make the connection with any of the other outlets, and whereby also should there be a breakage of the connections, or even leakage in one or more of the reservoirs, the same may be cut out from the remaining units of the particular series of which they form a part, and the other still be available in whole or in part.

Reference is to be had to the accompanying drawings forming a part of this specification, in which similar characters of reference indicate corresponding parts in all the figures.

Figure 1:
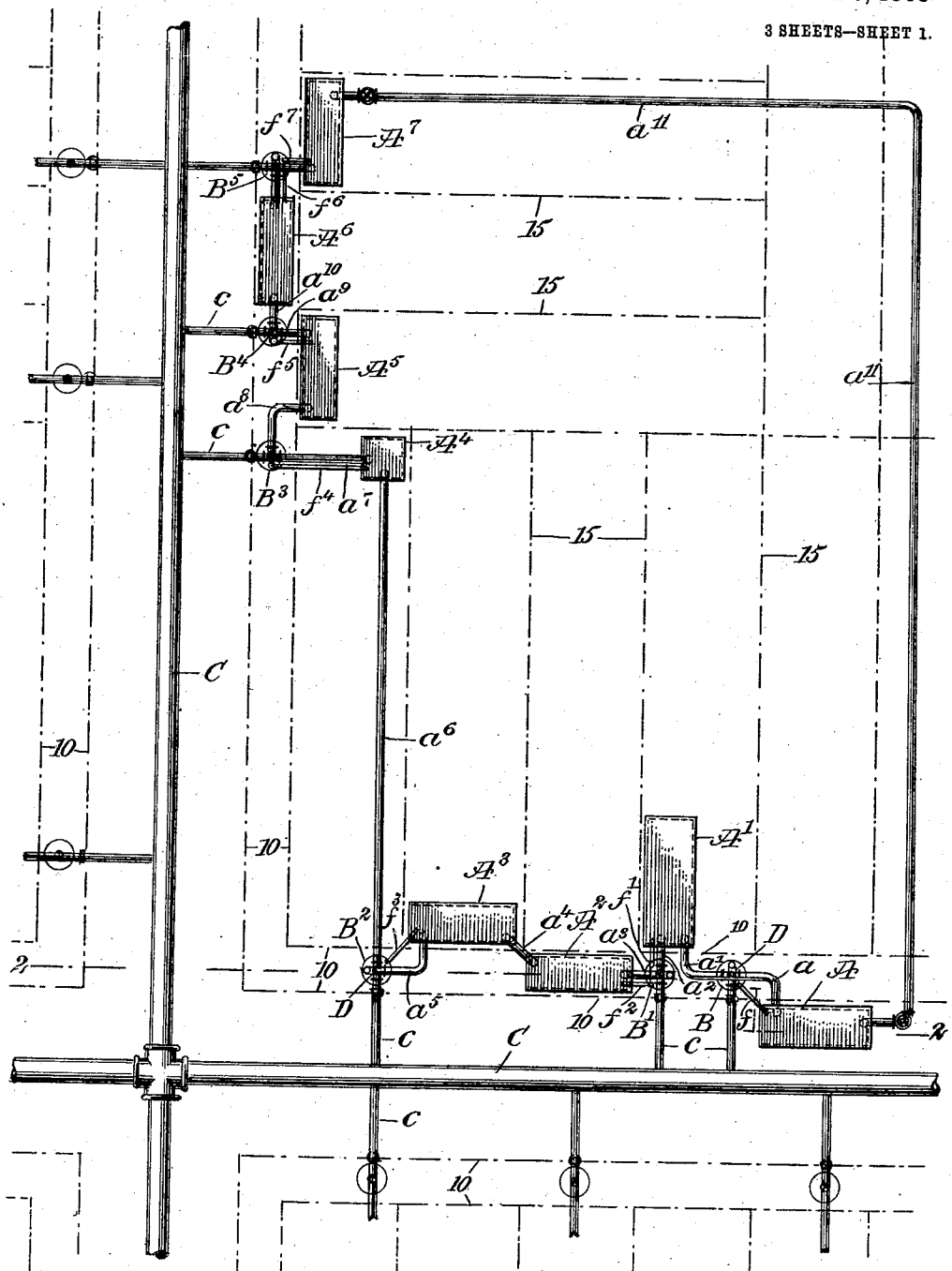
Figure 2:
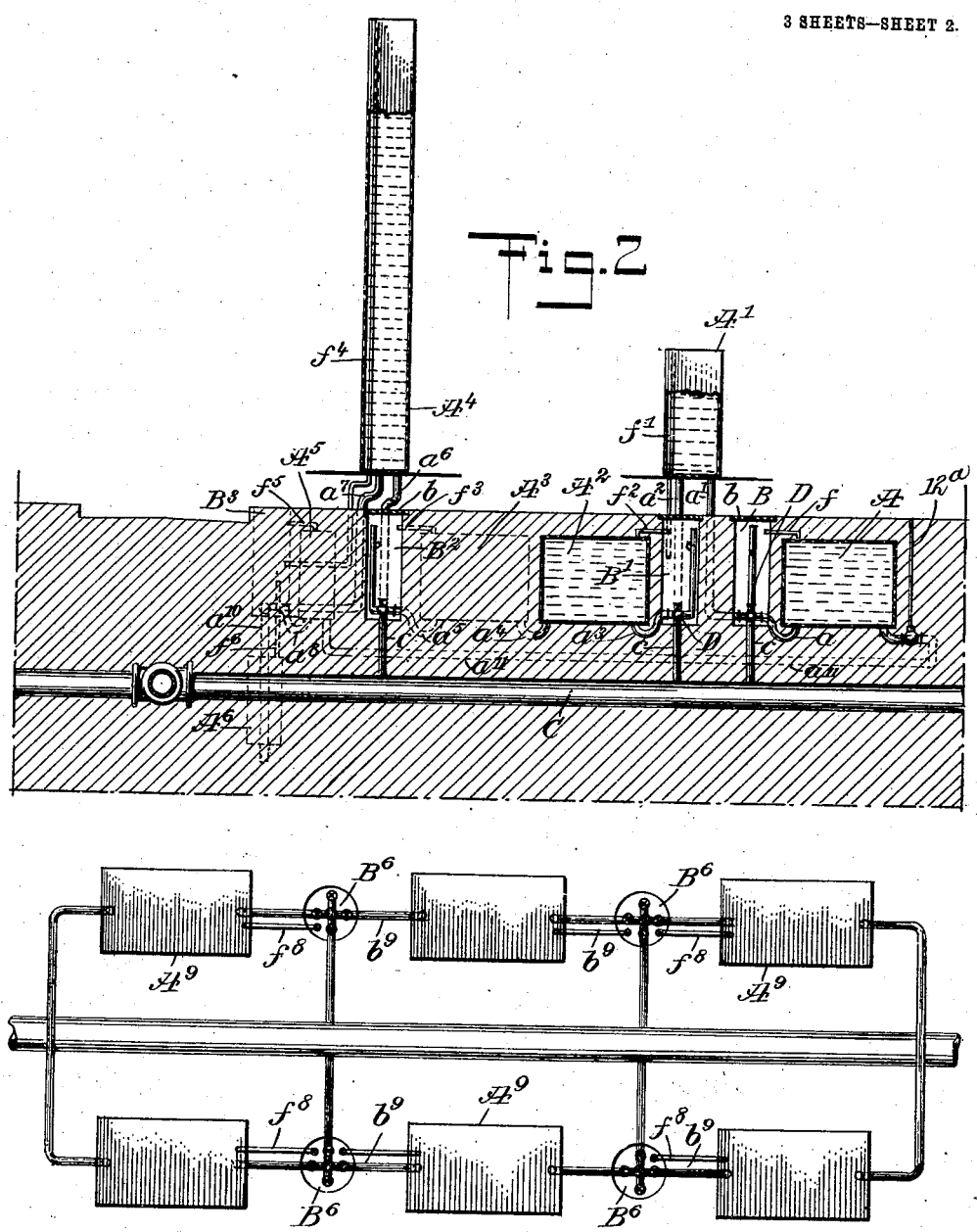
Figure 3:
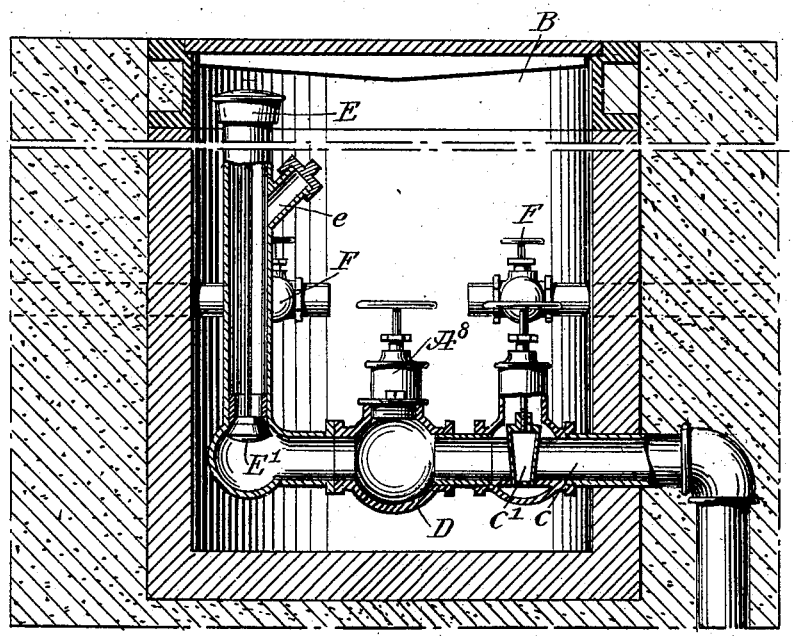
Figure 4:
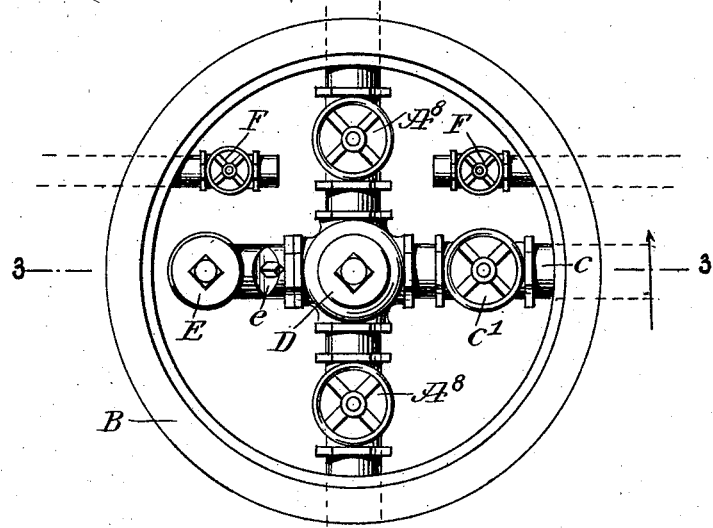

Figure 1 is a plan view of one embodiment of my invention, this view representing portions of city blocks, water mains, and a series of individual reservoirs and their appurtenances; Fig. 2 is a sectional elevation, the section being taken on about the line 2—2 of Fig. 1, parts of certain tanks in this view also being broken away; Fig. 3 is a sectional elevation, on the line 3—3 of Fig. 1 and on an enlarged scale, of the manhole and the several connections leading to the tanks and water supply; Fig. 4 is a plan view of said manhole and the connections; and Fig. 5 is a plan view of a modification in which all the tanks are shown as if arranged beneath the street.

The spaces between the dotted lines 10 in Fig. 1, represent the sidewalks of intersecting streets, and the dotted lines 15 indicate sub-divisions of a city block, the said sub-divisions representing a space, say, 20x100 feet, or 25x100 feet.

In the particular example illustrated, I have shown eight reservoirs in the form of tanks A, A', $A^2$, $A^3$, $A^4$, $A^5$, $A^6$, $A^7$, which may be arranged in any portion of a building lot or building, and at any height, it being necessary only to observe the precaution that the lowermost tank is not below the distance at which water can be raised by the ordinary fire engine. The tanks are shown as corresponding in number to the city lots indicated. The reservoirs may be made of any suitable material, such as steel, brickwork, cement or the like, but in any event the tank should be hermetically sealed, aside from the air and water pipes. Adjacent tanks are connected with each other by suitable pipes, hereinafter more particularly described, which establish connection between said tanks at points at the bottom, so that substantially all the water in one tank may flow or be drawn to the other. These pipes may lead to manholes B, B', $B^2$, $B^3$, $B^4$, $B^5$, to which also lead the pipes $c$ from the mains C, and to which also lead air vents, there being preferably a vent for each reservoir. The manholes are provided with covers $b$ and the pipes $c$ are fitted with valves $c'$.

A pipe $a$ leads from, at or near the bottom of the tank A to the next adjacent manhole B, where it is valved and communicates with a preferably four-way fitting D, and from said fitting leads a pipe $a'$ to the bottom of the next adjacent tank A': and from the bottom of said tank A' to the next manhole B' leads a pipe $a^2$, delivering to a four-way fitting, similar to that previously described, and said second fitting connects with the tank $A^2$ by a pipe $a^3$, and so on through the system. If desired, however, the connection between two adjacent reservoir units, such as $A^2$, $A^3$, instead of being made through a manhole and fittings therein, may consist of a simple connecting pipe as at $a^4$, Figs. 1 and 2, as it is only required that each tank have a connection in some one manhole. The latter mentioned connection should however, be used either only as a temporary expedient during unfinished building operations, or where there is an obstacle preventing the placing of a manhole or a valve which can be operated from the street surface, as at $a^{12}$, Fig. 2, for instance on account of lack of room, or on account of the pipes crossing the street; as the two tanks so connected will virtually form only one unit and their contents will inevitably be lost together, in case of an accident to either one.

$a^5$ represents a water pipe leading from the tank $A^3$ to the manhole $B^2$; a water pipe $a^6$ leads from the fitting of said manhole to the tank $A^4$; a pipe $a^7$ leads from the tank $A^4$ to the manhole $B^3$; and from the fitting in the manhole $B^3$ suitable connections are made, as by a pipe $a^8$ to the next tank $A^5$, thence suitable connections are made between the tanks $A^5$ and $A^6$, including the pipes $a^9$ and $a^{10}$; connections being also made between the tank $A^6$ and the tank $A^7$, which does not appear in Fig. 2, because being directly in line and at the same level with the tank $A^5$. Finally from the tank $A^7$ a connection is made as by a pipe $a^{11}$ with the first tank A. Of course, in a complete block of buildings, a system of tanks and their connections would extend around the complete block on the four sides.

In each manhole a suitable connection for the fire hose is provided, hydrants E being illustrated, having hose connections $e$.

In the arrangement of vents shown in the example given in the drawings, $f$ represents an air pipe leading from the top of the tank A to the manhole B; similarly a pipe $f'$ leads from the manhole $B'$ up through the bottom of the next tank $A'$ to a point near the top thereof, this arrangement being equivalent to the pipe $f$ of the first mentioned tank. $f^2$ represents the vent of the tank $A^2$; $f^3$ indicates the vent from the tank $A^3$; $f^4$ indicates the vent from the tank $A^4$; $f^5$ the vent of the tank $A^5$; $f^6$ the vent from the tank $A^6$; $f^7$ the vent from the tank $A^7$. Each vent pipe is provided with a valve F (Figs. 3 and 4). The water pipes $a$, $a'$, $a^2$, $a^3$, $a^4$, $a^5$, $a^6$, $a^7$ are each provided with a suitable valve $A^8$, and the hydrant E is also suitably valved as at $E'$, Fig. 3.

It is to be understood that either arrangement of vent pipe may be employed, that is, entering the tank directly at the top and passing to the proper manhole, or it may extend from the manhole up through the bottom of the tank to near the top, and the tanks may be arranged in such a position in a building, lot or adjacent point, as may be found most convenient.

In the form shown in Fig. 5, all the tanks, in this instance a series of six, are shown as they would be arranged beneath the street. In this figure, $A^9$ indicates the tanks; $B^6$ the manholes, and their connections similar to the first form; $b^9$ indicates water pipes connecting the several tanks through the medium of fittings and manholes, and $f^8$ indicates vent pipes.

In practice, it is designed that my auxiliary system, including its exterior connections at the manholes, be under the exclusive control of the fire department, the same as the ordinary hydrants of the present system.

In operation, the tanks or other reservoirs employed are filled preferably by opening the valve $c'$ in that manhole ($B^3$) which is adjacent to the highest tank ($A^4$) of the series; that valve $A^8$ at such side of the fitting D as is nearest to said highest tank, and also the valve F of the vent pipe ($f^4$) leading to said tank ($A^4$) in whichever manhole the particular vent pipe ($f^4$) has its outlet, are opened. The water from the main C will enter through the adjacent connecting pipe $c$ and the pipe as $a^7$, and fill the tank $A^4$, driving out the air contained therein through the vent $f^4$. When the tank is full, water will appear at the outlet of the vent pipe $f^4$ and the latter is then closed. The vent of the next tank to be filled and both the valves $A^8$ in the manhole located on the way to said tank are then opened, and so left for a short time until the pressure of water shall have driven out the air contained in the pipes, the proper vents and the proper controlling valves $A^8$ being opened or closed as required, to fill the next tank. The operation is continued, proceeding from one tank to the other until the entire series of tanks is filled. When a tank is located so high that the pressure from the water main is not sufficient to force water to the top of the tank, the fire department may attach a hose to the proper hydrant of the auxiliary storage system and pump water into said tank, taking for this purpose the water from the main through any connection in another manhole, or direct from an ordinary street hydrant, or other source of supply. When all the tanks of the series have thus been filled, all the vent pipes and supply valves $c'$ of said series of tanks must be kept closed. The valves controlling the pipes connecting the respective tanks may be either kept closed, to be opened when the auxiliary storage supply is needed, or these valves may be kept open to save time in case of an emergency, as experience may show to be preferable.

In the event of a fire occuring and the main should be broken, as by an earthquake, explosion or other accident, or if from any cause the fire department cannot obtain sufficient water pressure from nearby mains to supply the engines, then the auxiliary system is to be brought into action in the following manner: If the valves $A^s$ of the pipes $a$, $a'$, etc., all through the chain of tanks in a given series are already open, the valve F of the air vent leading to any tank of the series is opened, and the engine is connected with a hydrant E in any manhole available. The valve E′ controlling the hydrant connection being opened, water will flow to the engine from both directions until all the tanks are practically exhausted, the water mounting from such of the tanks as are located in a relatively lower position to others located relatively higher in the course of said flow. If, however, the valves $A^s$ of the connecting water pipes $a$, $a'$, etc., have been kept closed, when a fire occurs they will all either have to be opened and the vent pipe of some one or more tanks also opened, the engine thus having to wait for water until all this is done, or if an immediate supply of water is desired from the auxiliary system, those valves in the manhole adjacent to any available tank and the valve F of the vent pipe leading to said tank are first opened after the engine is connected with the hydrant; then the valves $A^s$ in the next manhole at either side, and the valves in the vent pipes leading to each neighboring tank are opened, while at the same time, at a given signal, the vent pipe of the preceding tank is again closed. This procedure is followed from manhole to manhole and from tank to tank at either side until the highest available tank has been reached and the entire chain of tanks thus connected will be in communication with each other.

Should a manhole have been covered by the debris of a fallen building, or be otherwise temporarily inaccessible, the respective valves of the pipes of the nearest accessible manhole at either side will be opened and the connection with the engine made there. Similar action will be taken if the manhole containing the outlet of the air pipe of the highest tank should be inaccessible. In such event the contents of the tanks directly affected by such obstruction may not be available, or may be lost, but the contents of the remaining tanks in the chain will nevertheless be available. This will apply in the same way if the connection between any two tanks in the series should become broken.
It will be observed that the tanks being hermetic, and the controlling valves so placed as to be accessible to the fire department only, and under the exclusive jurisdiction of the latter, the contents of the system whether contained in buildings or under the street, will be guarded against being tampered with by tenants or other unauthorized persons.

In using the term "street" in this specification and claims, it will be understood that I include the sidewalks, and in fact such places or spaces in a street or auxiliary thereto as are public, so as to be accessible to the fire department, as distinguished from private premises under the control of private parties.

I would mention that when there are no water mains at hand to supply my storage system, the several units thereof may be filled in the manner hereinbefore described with reference to the higher tanks, any convenient source of supply being availed of for this purpose. I wish it to be understood that when speaking of water mains I mean either the principal mains, or any of the branch mains leading from the principal mains through cross streets or minor streets; in fact, any part of the usual city water main system.

It will be understood that I do not limit myself to forming connections with the various reservoirs with a length of water pipe as shown, for where it is desirable to place one of the reservoirs immediately adjoining another, any connection or means of establishing communication between the two at or near the bottoms thereof, and any suitable valve or gate controlling the connection, with means for closing and opening the same from the street, may be employed, and it will also be understood, that I do not limit myself to the use of valves or gates for preventing the escape of water from a reservoir after it has entered the same, since any means or form of connection answers, which will permit the water to enter the reservoir but will prevent the accidental escape in the event of the breaking of the connections.

Having thus described my invention, I claim as new and desire to secure by Letters Patent,—

1. In a system of water storage for fire-extinguishing purposes, the combination with a water supply, of a closed tank or reservoir provided with a closable air vent entering said reservoir at or near its top, a valve-controlled connection with said supply, a closable outlet for the withdrawal of water from the reservoir, the closures of said outlet and air vent and the valves controlling the connection with the supply being accessible from the public street and arranged adjacent to each other to be operated from one point.

2. In a system of water storage, a series of hermetically closable reservoirs provided with air vents, means connecting said reservoirs consecutively with each other to form a chain, said means consisting of connections from the bottom of one reservoir to a point at the bottom of the following reservoir, and connections from another and different point at the bottom of said second reservoir to a point at the bottom of the next following reservoir, thus making possible the drawing of water from one reservoir into and through a following reservoir to the next succeeding reservoir and so on throughout the chain of reservoirs without necessitating the opening of the air vents in all the reservoirs, means for preventing the loss of the contents of said reservoirs in case of a breakage either of one of the reservoirs or of some of the mentioned connections, and outlets for withdrawing water from said reservoirs.

3. The combination with a street water main, of a storage system comprising a plurality of units, each consisting of a closed reservoir for storing water, said reservoirs being located under the level of the street in proximity to and along the line of said main, each reservoir being individually connected with said main by suitable connections provided with means whereby the reservoirs may be filled from said main and their contents prevented from returning; said reservoirs being provided with means for venting them and for the withdrawal of water independent of said main.

4. A system for the storage of water, comprising a plurality of individual closed reservoirs located under the level of the street in proximity to and along the line of the street water main, said reservoirs being consecutively connected by means, independent of the main, permitting the passage of water from one to the other, so as to form a chain, said chain having connections with said main at one or more points provided with means whereby it can be filled from the main and its contents prevented from returning, means for venting each reservoir, and outlets at different points in said chain for the withdrawal of water.

5. In a system of water storage for use in extinguishing fires, a plurality of individual storage reservoirs connected by valve-controlled water-carrying pipes, said pipes having a closable opening for the entrance or the withdrawal of water, the opening and the valves controlling the water-carrying pipes being located in a manhole leading to the street surface, and means for venting said reservoirs.

6. A water storage system for use in extinguishing fires, comprising a plurality of individual units for the reception of water and the storage thereof until required, each unit having connection with the neighboring unit or units, such that they form a continuous chain of reservoirs, and a means for controlling said connections so that the said storage units may either be closed off from each other or connected together to afford a flow of water from unit to unit throughout the chain in either direction as required, and means affording access to any desired unit for withdrawing water therefrom.

7. In a water storage system for use in extinguishing fires, a series of closed individual storage reservoirs so connected consecutively by valve-controlled water-carrying pipes having closable openings located at different points in the series for the entrance or withdrawal of water that the water contained in said reservoirs may be drawn from any reservoir to any neighboring reservoir in either direction and through said next reservoir to any opening which may be located at the farther side of said reservoir and on through any further consecutively following pipes and reservoirs, to another outlet, the arrangement permitting the flow of water from any of the reservoirs of the series to any of the openings in said series.

8. In a system of water storage, a plurality of individual hermetically closed reservoirs for the storage of water until required, said reservoirs having a connection with a street water main, whereby they can be filled from the same and their contents prevented from returning to the main, said reservoirs having connections with each other consecutively and independent of the water main, so that water may flow from one to the other in either direction, and outlets at different points for the withdrawal of water from said reservoirs.

9. A system for the storage of water, comprising a plurality of individual closed reservoirs consecutively connected with each other by valve-controlled connections to form a chain, said chain of reservoirs paralleling the street water mains and having valve controlled connections with said mains at one or more points in said chain, whereby it can be filled from the main and then be disconnected therefrom to so remain until required to be filled again, and outlets at different points, either of which outlets permits the withdrawal of water from the said chain.

10. In a system of water storage, a plurality of hermetically closed water reservoirs connected by valve-controlled water-carrying pipes, a closable opening in said pipes between two adjoining reservoirs for the entrance and withdrawal of water from said reservoirs, an air vent pipe leading from the top of one of said reservoirs, the outer end of said vent pipe being provided with means for closing the same and being located at a point immediately adjacent to the opening in the said water-carrying pipes and adjacent to the valves for controlling said water-carrying pipes, the latter pipes, the air vent pipe and the opening mentioned being thus controlled from a single point.

11. In a system of water storage for fire extinguishing purposes, the combination of a plurality of reservoirs or storage units consecutively connected at or near their bottoms by valve-controlled connections to form a chain, hermetically closable air vents at or near the top of one or more of said reservoirs, and hermetically closable openings for the entrance and withdrawal of water at different points in said chain, the said combination of reservoirs, connections, closable air vents, and closable openings affording means for constituting and forming any part of said system into one hermetically closed and continuous conduit for the movement of water contained therein between any desired air vent which is opened to any desired water outlet when opened.

In testimony whereof I have signed my name to this specification in the presence of two subscribing witnesses.

LEWIS H. SONDHEIM.

Witnesses:
J. L. McAULIFFE,
EVERARD B. MARSHALL.